(12) United States Patent
Horiguchi et al.

(10) Patent No.: US 10,955,836 B2
(45) Date of Patent: Mar. 23, 2021

(54) DIAGNOSIS SYSTEM AND ELECTRONIC CONTROL DEVICE

(71) Applicant: Hitachi, Ltd., Tokyo (JP)

(72) Inventors: Tatsuya Horiguchi, Tokyo (JP); Teppei Hirotsu, Tokyo (JP); Hiroshi Iwasawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 16/301,920

(22) PCT Filed: Apr. 13, 2017

(86) PCT No.: PCT/JP2017/015068
§ 371 (c)(1),
(2) Date: Nov. 15, 2018

(87) PCT Pub. No.: WO2017/199652
PCT Pub. Date: Nov. 23, 2017

(65) Prior Publication Data
US 2019/0187675 A1 Jun. 20, 2019

(30) Foreign Application Priority Data
May 16, 2016 (JP) .............................. JP2016-097576

(51) Int. Cl.
*G05B 23/02* (2006.01)
*G05B 19/042* (2006.01)

(52) U.S. Cl.
CPC ....... *G05B 23/0221* (2013.01); *G05B 19/042* (2013.01); *G05B 2219/2637* (2013.01)

(58) Field of Classification Search
CPC .......... G05B 19/042; G05B 2219/2637; G05B 23/0221
See application file for complete search history.

(56) References Cited

U.S. PATENT DOCUMENTS 5,566,092 A * 10/1996 Wang ................. G05B 19/4184
700/159
5,568,028 A * 10/1996 Uchiyama .......... G05B 19/4065
318/433

(Continued)

FOREIGN PATENT DOCUMENTS

JP 2004-31773 A 1/2004
JP 2006-40220 A 2/2006

(Continued)

OTHER PUBLICATIONS

Japanese-language Office Action issued in counterpart Japanese Application No. 2018-518160 dated Dec. 3, 2019 with English translation (five (5) pages).

(Continued)

*Primary Examiner* — Kidest Bahta
(74) *Attorney, Agent, or Firm* — Crowell & Moring LLP

(57) ABSTRACT

Provided is a method of detecting and preventing soft errors without performing multiplexing. As a result, it is possible to improve reliability of a device while suppressing an increase in mounting cost and reduction in operation speed accompanied with it. A diagnosis system includes an initial parameter generation unit which generates a plurality of initial parameters predicted on the basis of an external input; an operation unit which has a plurality of operators operating optimal solutions to the initial parameters by using an evaluation function describing a control object; and a diagnosis unit which diagnoses the operation unit on the basis of an output of the operation unit. When an optimal solution candidate giving an evaluation value deviating from a value taken by each evaluation value by a constant threshold or more among evaluation values corresponding to the optimal solutions to the initial parameters is found, the diagnosis unit diagnoses an error of the operation unit.

7 Claims, 10 Drawing Sheets

(56) References Cited

U.S. PATENT DOCUMENTS

| | | | |
|---|---|---|---|
| 6,496,782 B1* | 12/2002 | Claus | G05B 23/0221 702/34 |
| 2002/0044049 A1* | 4/2002 | Saito | G07C 5/008 340/438 |
| 2003/0072630 A1* | 4/2003 | Kato | B23Q 1/0009 409/230 |
| 2006/0047382 A1* | 3/2006 | Morioka | G07C 5/0808 701/31.9 |
| 2007/0260656 A1* | 11/2007 | Wiig | G01M 13/028 708/200 |
| 2012/0224069 A1 | 9/2012 | Aoki | |
| 2016/0041070 A1* | 2/2016 | Wascat | G05B 23/024 702/183 |
| 2018/0259462 A1* | 9/2018 | Otake | G01T 3/06 |

FOREIGN PATENT DOCUMENTS

| | | |
|---|---|---|
| JP | 2007-127610 A | 5/2007 |
| JP | 2012-58188 A | 3/2012 |
| JP | 2015-26279 A | 2/2015 |
| JP | 2016-18230 A | 2/2016 |
| JP | 2016-31179 A | 3/2016 |

OTHER PUBLICATIONS

International Search Report (PCT/ISA/210) issued in PCT Application No. PCT/JP2017/015068 dated Jun. 6, 2017 with English translation (five (5) pages).

Japanese-language Written Opinion (PCT/ISA/237) issued in PCT Application No. PCT/JP2017/015068 dated Jun. 6, 2017 (five (5) pages).

\* cited by examiner

DIAGNOSIS SYSTEM AND ELECTRONIC CONTROL DEVICE

TECHNICAL FIELD

The present invention relates to an electronic control device and relates to a means for outputting an appropriate control operation result, when an operation is performed on the basis of signals input from various sensors mounted on a control target to the electronic control device and a result is output.

BACKGROUND ART

In driving support technology and automatic driving technology, in order to protect passengers and a peripheral environment, it is necessary to perform appropriate control according to a driving situation and a surrounding environment situation. As an example of such control, a method called trajectory planning is known. It is known that a trajectory planning problem results in an optimization problem and as an example of its solution, an exploratory solution utilizing meta-heuristics such as group intelligence is known. The exploratory solution in the trajectory planning problem has high affinity to acceleration using hardware having high parallelism in general, because the exploratory solution has features of performing a large number of operations having the same structure simultaneously and in parallel. Meanwhile, in the trajectory planning problem, from the viewpoint of the safety of the passengers and the peripheral environment, high reliability is required for an electronic control device that performs trajectory planning operations.

In a field requiring high reliability, there is known a conventional method of multiplexing and mounting identical logics, performing comparison or a majority decision, and performing error detection or masking. For example, in PTL 1, identical logics are tripled and a majority decision circuit is added, thereby implementing processing for masking an error and continuously performing a correct output, even when the error occurs in one of the tripled logics.

CITATION LIST

Patent Literature

PTL 1: JP 2015-26279 A

SUMMARY OF INVENTION

Technical Problem

In the method of performing multiplexing as described above, it is necessary to mount a plurality of identical logics and a cost increases due to an increase in resources required for implementing a function. Particularly, it is known that, in an algorithm of the exploratory solution, operation units having the same structure are mounted in parallel as described above to improve operation accuracy and speed and it is considered that multiplexing the operation units affects an increase in the mounting cost.

An object of the present invention is to provide a method of detecting and preventing soft errors without performing multiplexing, thereby improving reliability while suppressing an increase in mounting cost and reduction in operation speed accompanied with it.

Solution to Problem

According to the present invention, a diagnosis system includes an initial parameter generation unit which generates a plurality of initial parameters predicted on the basis of an external input; an operation unit which has a plurality of operators operating optimal solutions to the initial parameters by using an evaluation function describing a control object; and a diagnosis unit which diagnoses the operation unit on the basis of an output of the operation unit. When an optimal solution candidate giving an evaluation value deviating from a value taken by each evaluation value by a constant threshold or more among evaluation values corresponding to the optimal solutions to the initial parameters is found, the diagnosis unit diagnoses an error of the operation unit.

Advantageous Effects of Invention

According to the present invention, it is possible to provide a method of diagnosing and preventing errors without performing multiplexing, thereby improving reliability of a device while suppressing an increase in mounting cost.

DESCRIPTION OF EMBODIMENTS

Hereinafter, electronic control devices and diagnosis systems according to embodiments of the present invention will be described using the drawings.

First Embodiment

Figure 1:
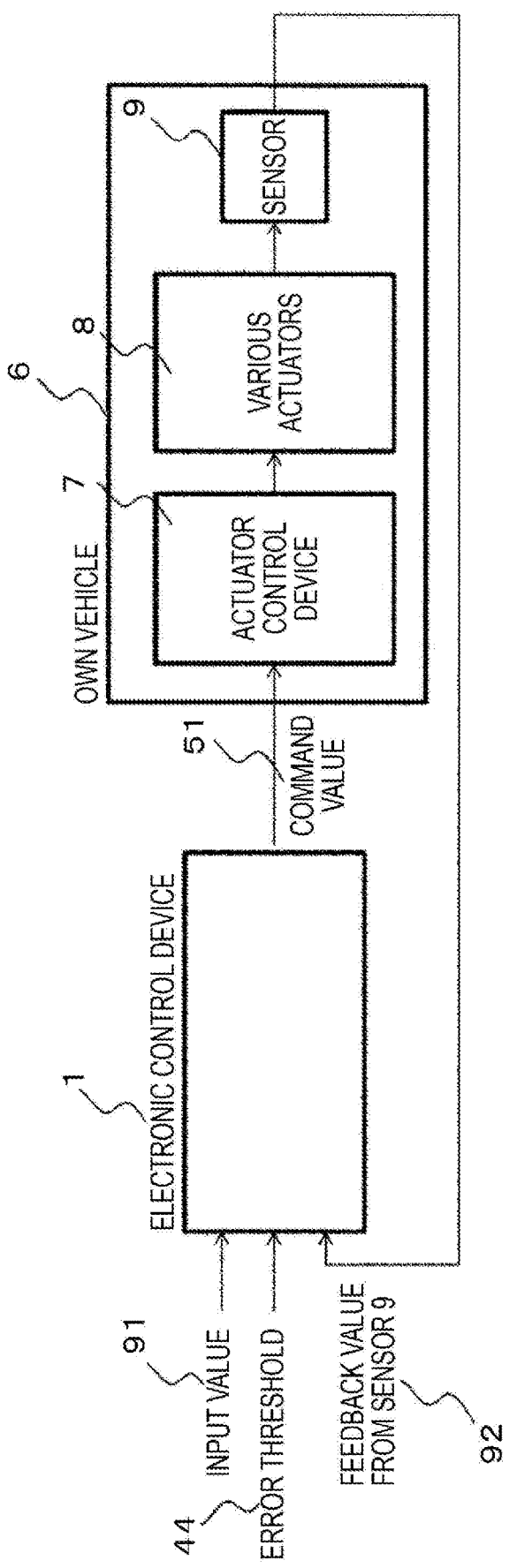
FIG. 1 is a block diagram showing configurations of an electronic control device 1 according to a first embodiment of the present invention and an own vehicle 6 to be a control target.

FIG. 1 is a block diagram showing a structure of a control system including an electronic control device 1 according to the present embodiment and an own vehicle 6 to be a control target. The electronic control device 1 shown in FIG. 1 receives an input value 91 and an error threshold 44 given from a host electronic control device not shown in the drawing and a feedback value 92 including peripheral information and own vehicle information of the own vehicle 6, which is obtained from a sensor 9 mounted on the own vehicle 6, determines acceleration information necessary for travelling of the own vehicle 6 as a control output 51, and drives various actuators 8 via an actuator control device 7 of the own vehicle 6, thereby controlling the own vehicle 6. As the sensor 9 mounted on the own vehicle 6, a camera and a laser radar functioning as external recognition sensors or a vehicle speed sensor functioning as an internal information sensor and acquiring information of the own vehicle is considered. Further, it is assumed that the electronic control device 1 can have an external environment model (not shown in the drawings) that predicts behaviors of other moving objects in an external environment, for example, a surrounding area, if necessary.

Figure 2:
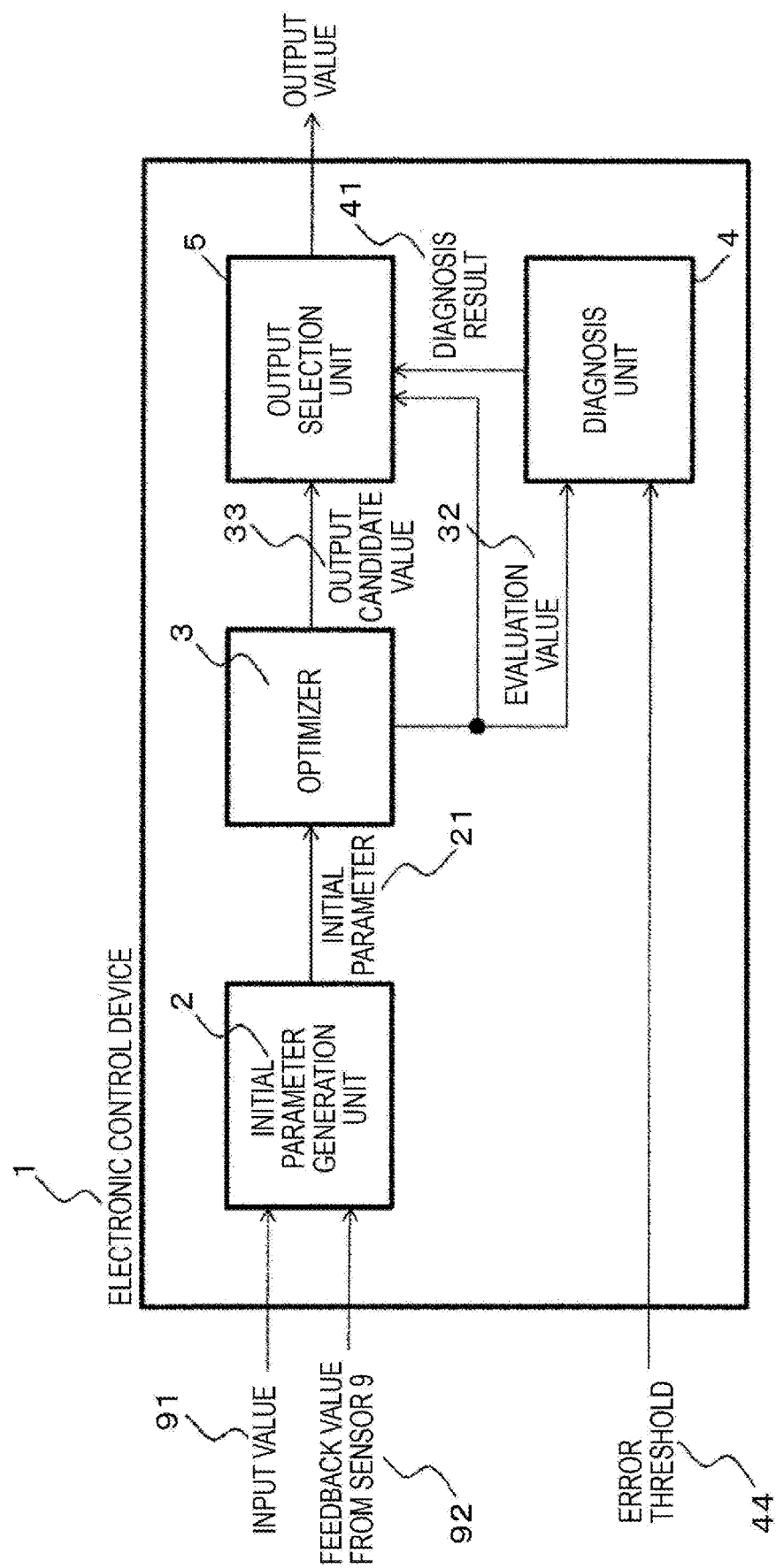
FIG. 2 is a block diagram showing an internal configuration of the electronic control device 1 according to the first embodiment of the present invention.

FIG. 2 is a functional block diagram showing internal functions of the electronic control device 1. The electronic control device 1 includes an initial parameter generation unit 2 that generates initial parameters for solving an optimization problem using an exploratory solution, on the basis of the input value 91 and the feedback value 92 from the sensor 9, which are input to the electronic control device 1 an optimizer 3 that performs an optimization operation on the basis of an initial estimation solution 21 generated by the initial parameter generation unit 2, a diagnosis unit 4 that diagnoses an output from the optimizer 3, and an output selection unit 5 that selects an optimal output from the initial parameters 21 generated by the initial parameter generation unit 2, on the basis of a diagnosis result 41 in the diagnosis unit 4.

Figure 3:
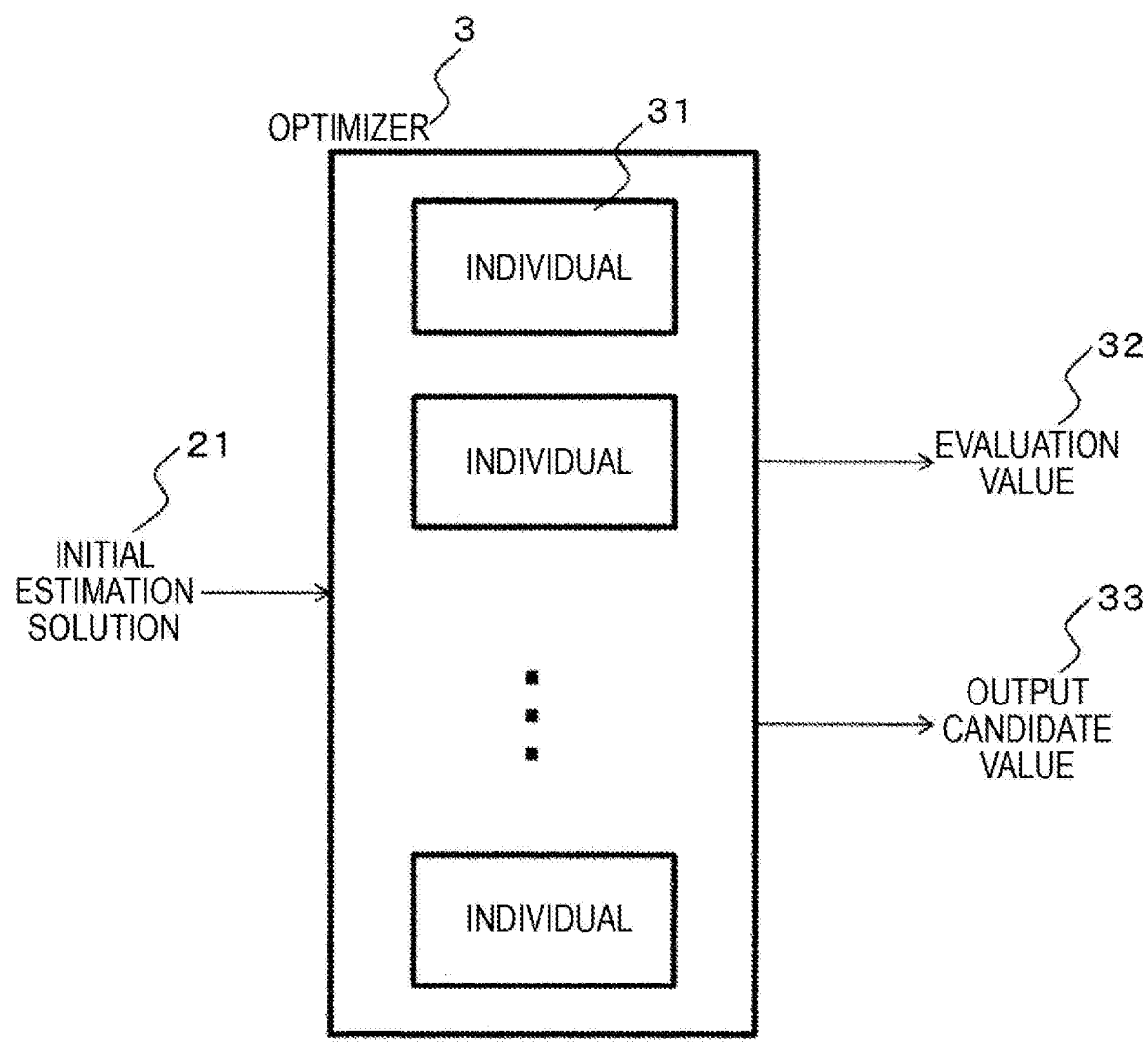
FIG. 3 is a block diagram showing an internal configuration of an optimizer 3 according to the first embodiment of the present invention.

FIG. 3 is a block diagram showing a configuration of the optimizer 3 in the electronic control device 1. The optimizer 3 includes a large number of individuals 31 used in an algorithm such as group intelligence.

Figure 4:
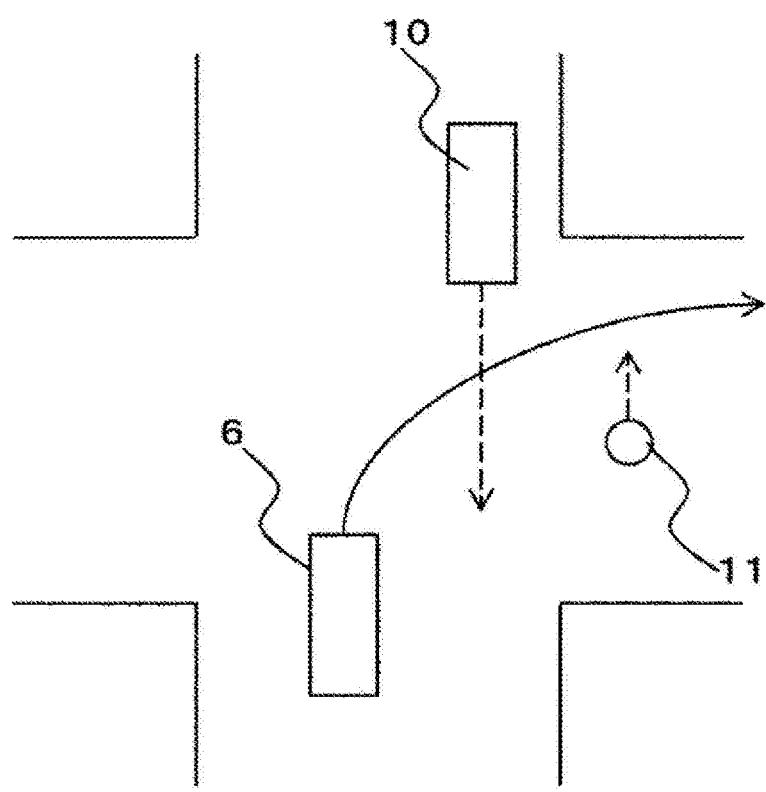
FIG. 4 is an example of a travelling environment in which the own vehicle 6 using the electronic control device 1 according to the first embodiment of the present invention travels.

Hereinafter, control performed by the electronic control device 1 will be described. FIG. 4 shows a scene of a driving situation in which the own vehicle 6 is about to make a right turn within a signal in which various other moving objects (another vehicle 10 and a pedestrian 11) exist, at a certain time TO. The own vehicle 6 detects positions and speeds of another vehicle 10 and the pedestrian 11 by using the sensor 9 mounted on the own vehicle 6 and plans a future trajectory of the own vehicle 6 conforming to a target function or a constraint condition determined in advance, using future behavior prediction of another vehicle 10 and the pedestrian 11 obtained using the external environment model not shown in the drawings. In the present embodiment, the external environment model is a model for estimating courses and speeds on the basis of state quantities obtained by observing another vehicle 10 and the pedestrian 11 using the sensor 9. However, an external environment model utilization method is not limited to this.

The initial parameter generation unit 2 determines, as observation values of the sensor 9 at the time TO, a plurality of acceleration command values and steering angles to be behaviors of the own vehicle 6 taken until a time T1 to be a time later than the time TO by a constant period, on the basis of positions and speeds of the own vehicle 6, another vehicle 10, and the pedestrian 11, and outputs them as an initial estimation solution 21 to the optimizer 3.

The individuals 31 in the optimizer 3 respectively calculate the target function and update an operation amount prediction value over a constant period in the future for the own vehicle 6 to be updated by crossing between the individuals 31, on the basis of the behavior prediction of another vehicle 10 and the pedestrian 11 and the initial estimation solution 21 given from the initial parameter generation unit 2. This process is repeated a predetermined number of times to search for an optimal solution, evaluation values 32 are output from the respective individuals 31 to the diagnosis unit 4, and output candidate values 33 to be candidate values of the output 51 of the electronic control device 1 are output to an output selection unit 5.

Figure 5:
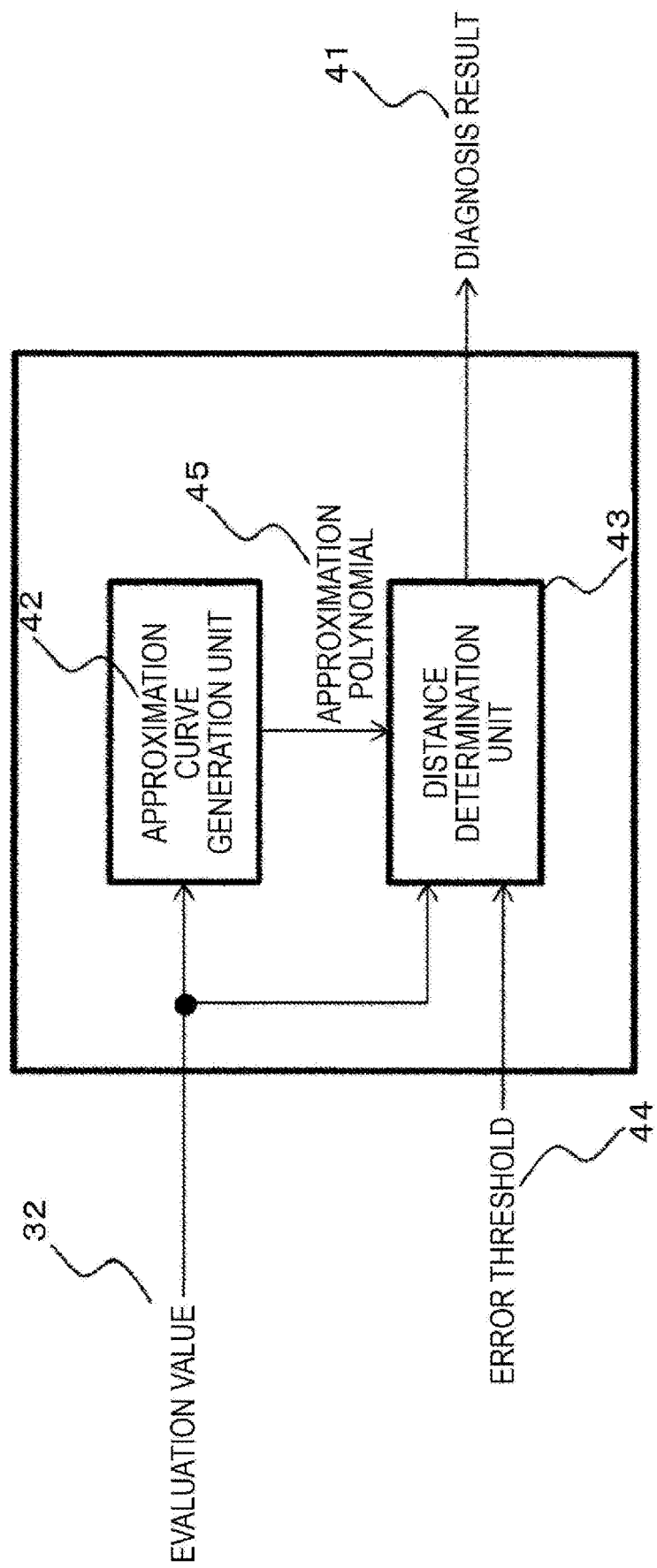
FIG. 5 is a block diagram showing an internal configuration of a diagnosis unit 4 according to the first embodiment of the present invention.

FIG. 5 is a block diagram showing an internal configuration of the diagnosis 4. The diagnosis unit 4 includes an approximation curve generation unit 42 that generates an approximation curve of the evaluation value 32 on the basis of the evaluation value 32 output from the optimizer 3 and a distance determination unit 43 that determines a distance from the approximation curve 41 of the evaluation value 32.

Figure 6:
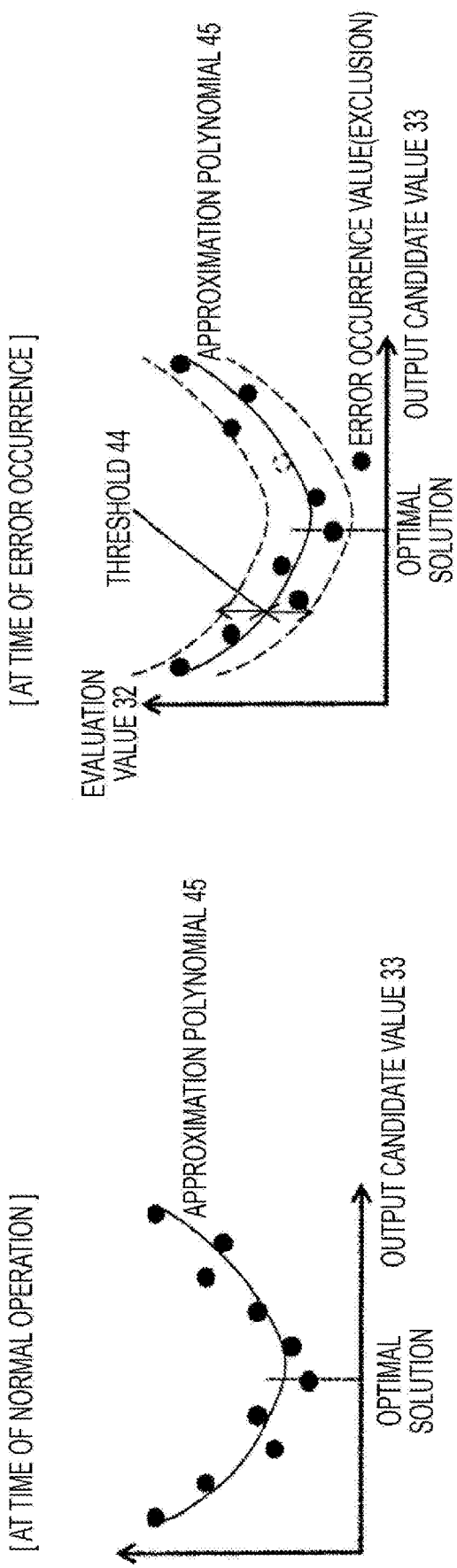
FIG. 6 is a graph showing a relation between an evaluation value 32 and an approximation curve generated by an approximation curve generation unit 42 on the basis of the evaluation value 32, in the diagnosis unit 4 according to the first embodiment of the present invention.

FIG. 6 is a graph showing the approximation curve generated by the approximation curve generation unit 42. The approximation curve generation unit 42 performs polynomial approximation on the evaluation value 32 output from each individual 31 in the optimizer 3. The approximation curve generation unit 42 outputs an approximation polynomial 45 to the distance determination unit 43. The distance determination unit 43 determines whether or not the evaluation value 32 is included within a certain threshold from the approximation polynomial 45 and outputs a diagnosis result 41 for determining the evaluation value 32 deviating from the approximation polynomial 45 by the threshold 44 or more as an error.

The output selection unit 5 excludes the output candidate value 33 including an error in the optimizer from the output candidate values 33 output from the optimizer 3, on the basis of the diagnosis result 41 output from the diagnosis unit 4, and outputs the output candidate value 33 corresponding to the individual 31 outputting an optimal evaluation value among the remaining output candidate values as the output value 51 of the electronic control device 1.

Figure 7:
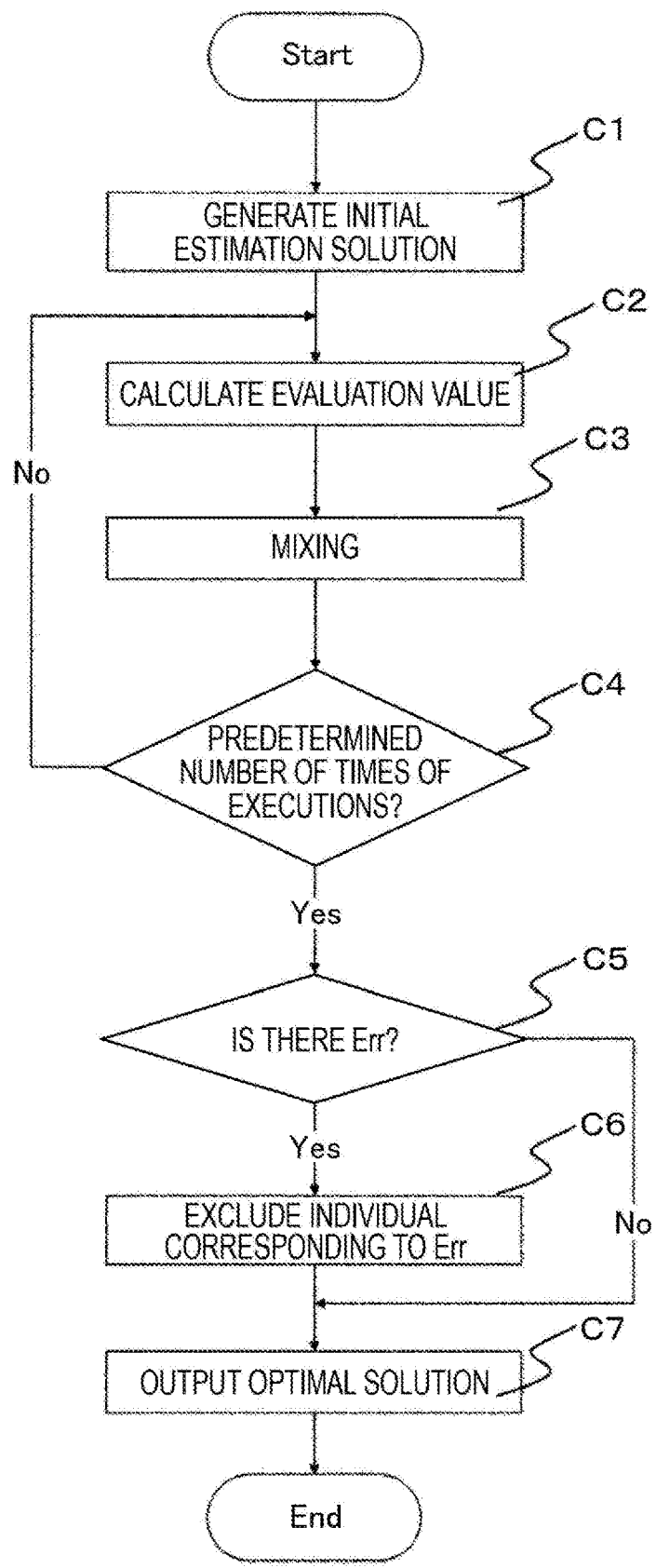
FIG. 7 is a flowchart showing an operation of the electronic control device 1 according to the first embodiment of the present invention.

An operation of the electronic control device 1 according to the present invention described above will be described using a flowchart shown in FIG. 7. The electronic control device 1 performs the following operation for each sampling period of the sensor 9. First, the initial estimation solution 21 to be given to the optimizer 3 is generated by the initial parameter generation unit 2 on the basis of based on the sensor observation value 92 showing the states of the own vehicle 6, another vehicle 10, and the pedestrian 11 and the input value 91 showing a control target of the electronic control device 1 given from a host controller not shown in the drawings (C1). In the optimizer 3, calculation of the target function by the individuals 31 is performed (C2) and updating of the parameters of the individuals 31 is performed by crossing between the individuals 31 (C3). The target function calculation (C2) and the parameter updating (C3) are executed a predetermined number of times determined at the time of designing the electronic control device 1. After the predetermined number of times of executions, the evaluation values 32 are output to the diagnosis unit 4 and the output candidate values 33 are output to the output selection unit 5 (C4). In the diagnosis unit 4, the approximation curve generation unit 42 performs the polynomial approximation on the evaluation value 32 output from each individual 31 of the optimizer 3 and the distance determination unit 43 determines whether the distance between the polynomial created by the approximation curve generation unit 42 and the evaluation value 32 output from each individual 31 in the optimizer 3 is the threshold 44 or less, thereby diagnosing presence or absence of an error occurring in each individual 31 in the optimizer 3 (C5). When there is the evaluation value 32 including the error by the diagnosis, the diagnosis result 41 is output to the output selection unit 5 and the output candidate value 33 output from the individual 31 including the error is excluded (C6). The output selection unit 5 selects, as an output of the electronic control device 1, an optimal output for the control object when based on the evaluation value 32 among the output candidate values other than the output candidate value including the error excluded in C6 and outputs it (C7).

Figure 8:
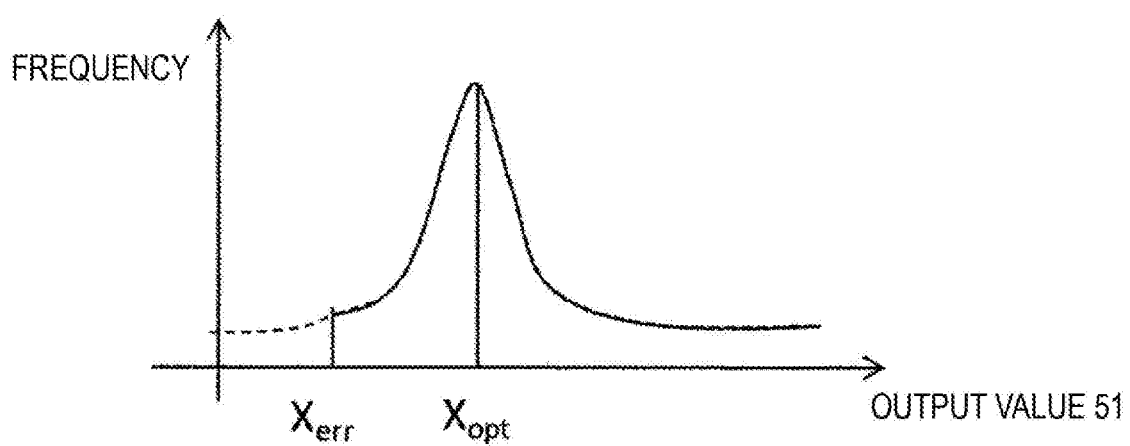
FIG. 8 is a histogram showing features of an output value 51 in a high error environment, in the electronic control device 1 according to the first embodiment of the present invention.
Figure 9:
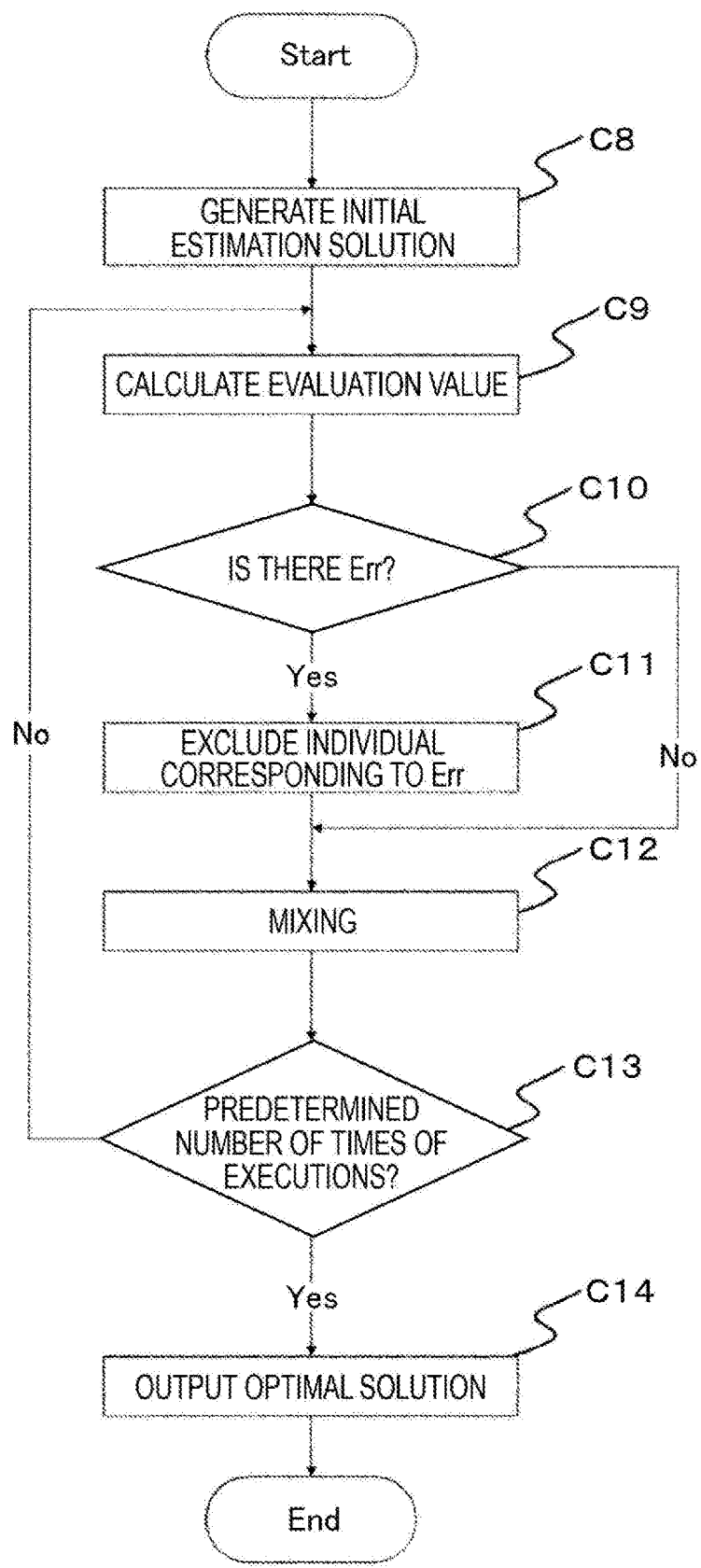
FIG. 9 is a flowchart showing an operation of an electronic control device 1 according to a second embodiment of the present invention.

FIG. 8 is a diagram showing the behaviors of the electronic control device 1 when the electronic control device 1 performing the above operation is operated in an environment with the high error frequency, for example, when a soft error occurrence rate is increased by performing irradiation of a neutron beam. If the electronic control device 1 is operated with the input value 91 to the electronic control device 1 and the feedback value 92 from the sensor 9 fixed at constant values, an output of the electronic control device 1 is uniquely determined in a state in which an error does not occur. When the electronic control device 1 is used in an environment with the high error frequency, the state value held by the individual 31 in the optimizer 3 changes due to the soft error or the like, for example, and the evaluation value 32 changes. As shown in FIG. 6, when the error occurs, values other than the output value 51 to be originally be output as the optimal solution may be selected as the output of the electronic control device 1 due to the change in the evaluation value 32 and when a histogram is taken, a graph of FIG. 8 having an optimal solution Xopt as a maximum value is obtained. As features of the graph, since determination using the threshold 44 is performed, there are points where an output determined as an error by the threshold 44 is excluded, so that discontinuous points are generated in a frequency curve as shown in FIG. 8.

As described above, according to the electronic control device according to the present embodiment, when the optimization problem is solved using the exploratory solution, by providing a method of detecting and preventing soft errors without performing multiplexing by providing an error diagnosis mechanism using a feature of a solver of performing the same operation on the basis of different initial values, it is possible to improve reliability while suppressing an increase in mounting cost and reduction in operation speed accompanied with it.

Second Embodiment

Next, an electronic control device according to a second embodiment of the present invention will be described using the drawings.

Figure 10:
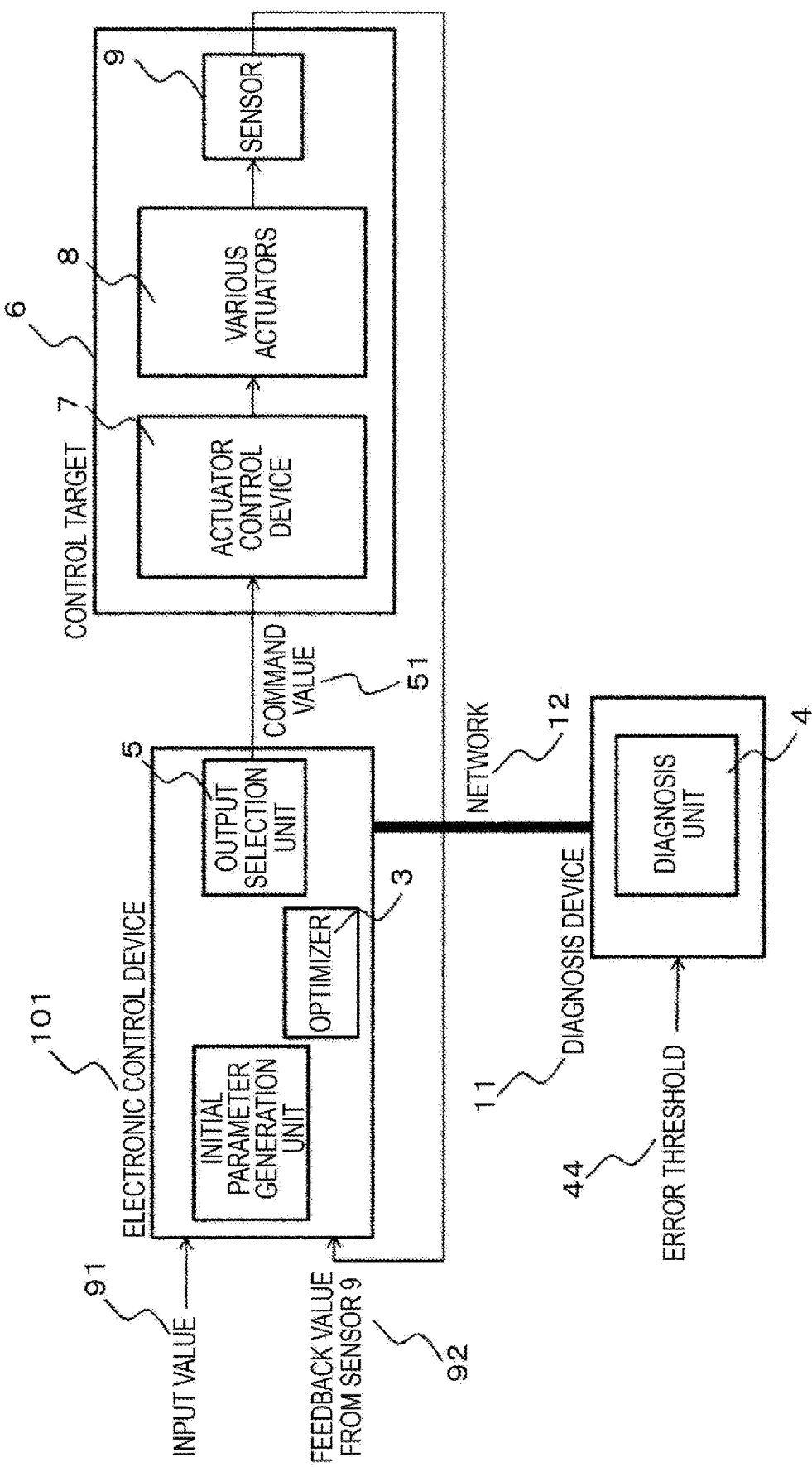
FIG. 10 is a block diagram showing a configuration of an electronic control device 1 according to a third embodiment of the present invention.

In the present embodiment, the case where control according to a flowchart shown in FIG. 10 is performed with respect to a hardware configuration as shown in FIG. 1 and problem setting as shown in FIG. 4, which are similar to the first embodiment, will be described.

FIG. 10 shows an operation of an electronic control device 1 in the present embodiment as described above. Similar to the first embodiment, initial parameters 21 to be given to an optimizer 3 are generated by an initial parameter generation unit on the basis of external input values 91 and 92 (C8). In the optimizer 3, calculation of a target function by individuals 31 is performed (C9) and updating of parameters of the individuals 31 by crossing between the individuals 31 is performed (C12). However, at this time, diagnosis using a diagnosis unit 4 is performed on an evaluation value of each individual (C10). A diagnosis method is the same as the first embodiment. When there is an evaluation value 32 including an error by the diagnosis, a diagnosis result 41 is output to an output selection unit 5, so that an output candidate value 33 output from the individual 31 including the error is excluded (C11). For the excluded individual 31, the subsequent operation may be discarded or an initial parameter generation unit 2 may regenerate a new initial parameter 21 to resume an operation. For a threshold 44 for determining the error in C11, a constant value may be used, for example, a value decreasing according to an increase in the number of repetitions of an optimization operation may be used. This is because there are features that a variation of the evaluation value 32 is large at the start of the optimization operation and the state and the evaluation value 32 of each individual 31 converge on an approximately optimal solution, according to the increase in the number of repetitions. As described above, after excluding the individual 31 having the error, parameter updating by crossing between the individuals 31 is performed (C12). After repeating this a predetermined number of times (C13), the optimal solution is output (C14).

The above is a difference with the first embodiment in the operation of the electronic control device 1 according to the present embodiment. According to the present embodiment, detection and exclusion of the individual 31 including the error occurring during repetition of the optimization operation in the operation of the electronic control device 1 described in the first embodiment are performed early. As a result, it is possible to maintain the number of individuals not including errors contributing to the search of the optimal solution and it is possible to maintain the convergence of the optimization operation.

Third Embodiment

Next, a diagnosis device according to a third embodiment of the present invention will be described using the drawings.

In the present embodiment, as shown in FIG. 10, a diagnosis unit 4 is mounted as a diagnosis device 11 to be a device different from an electronic control device 1. The diagnosis device 11 is directly connected to the electronic control device 1 or is connected to the electronic control device 1 via a network 12. The diagnosis device 11 verifies an evaluation value 32 output from an optimizer 3 of an electronic control device 101 using the diagnosis unit 4 and notifies an output selection unit 5 of presence or absence of an error and an individual number in which the error occurs. The diagnosis unit 4 may use the system described in the first and second embodiments, may be mounted on a server and perform abnormality detection by a means such as machine learning, or may be used as a system for allowing a person to monitor abnormality through a system for visualizing a control state not shown in the drawings.

The above is a difference with the first and second embodiments in the operations of the electronic control device 101 and the diagnosis device 11 according to the present embodiment. According to the present embodiment, the operation of the electronic control device 1 described in the first and second embodiments can be monitored and diagnosed by using the diagnosis device 11 outside the electronic control device. As a result, for example, highly accurate abnormality detection by a computer having sufficient computational resources and manual monitoring for an important system are enabled with respect to the electronic control device 1 and reliability of the system can be improved.

The embodiments and the various modifications described above are merely examples and the present invention is not limited to these contents as long as the features of the present invention are not impaired.

REFERENCE SIGNS LIST

1 electronic control device
2 initial parameter generation unit
3 optimizer
31 individual group performing optimization
32 solution candidate value
4 diagnosis unit
41 diagnosis result
42 approximation curve generation unit
43 distance determination unit
44 error threshold
45 approximation polynomial
5 output selection unit
51 output value of electronic control device
6 own vehicle
7 electronic control device for controlling various actuators mounted on own vehicle
8 various actuators mounted on own vehicle
9 sensor mounted on own vehicle
91 input value from host electronic control device (not shown) to electronic control device 1
92 input value from sensor 9 to electronic control device 1
10 vehicle
11 pedestrian

The invention claimed is:

1. A diagnosis system, comprising:
a processor configured to execute a plurality of instructions to cause the generation of:
an initial parameter generation unit which generates a plurality of initial parameters predicted on the basis of an external input;
an optimizer to generate a plurality of evaluation values corresponding to the plurality of initial parameters using an evaluation function that describes a control objective;
an approximation curve generator to generate a polynomial approximation curve based on the plurality of evaluation values generated by the processors of the optimizer; and
an electronic diagnosis device to diagnose the optimizer on the basis of the evaluation values output from the optimizer and received by the electronic diagnosis device, wherein when an optimal solution candidate is discovered from the plurality of evaluation values that deviates by at least a constant threshold from the polynomial approximation curve, the electronic diagnosis device diagnoses an error of the optimizer.

2. The diagnosis system according to claim 1, wherein the error is diagnosed in the electronic diagnosis device by comparing a distance between each evaluation value of the plurality of evaluation values and the polynomial approximation curve.

3. The diagnosis system according to claim 1, wherein the constant threshold used when the error is diagnosed in the electronic diagnosis device decreases according to an increase in the number of repetitions of an operation.

4. The diagnosis system according to claim 1, wherein the initial parameter generation unit and the optimizer having the plurality of processors generating the optimal solutions to the initial parameters by using the evaluation function describing the control objective are provided in an electronic control device and the electronic diagnosis device is connected to the electronic control device via a network.

5. The diagnosis system according to claim 4, wherein the electronic diagnosis device repeatedly diagnoses the optimizer and stops an operation of the electronic control device when abnormality is detected.

6. An electronic control device comprising:
a processor configured to execute a plurality of instructions to cause the generation of:
an output selector to output a command value to control a control target based on an initial parameter; and
an initial parameter generation unit to generate the initial parameter and to receive an external input;
an electronic diagnosis device to determine an occurrence of an error, wherein
in response to the determined occurrence of the error, the output selector excludes the command value associated with the error from being output, and
when the external input received by the electronic control device is constant, a discontinuous point exists in an appearance frequency curve of the command value, based on the occurrence of the error, in an environment with an error frequency in which a neutron beam exists.

7. The diagnosis system according to claim 1, wherein the constant threshold is received from a host electronic control device.

* * * * *